Patented Aug. 9, 1932

1,870,404

UNITED STATES PATENT OFFICE

RALPH B. DERR, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA

METHOD OF TREATING WATER

No Drawing.   Application filed November 9, 1929. Serial No. 406,163.

This invention relates to water treating processes, and especially to the clarification of municipal and industrial waters by means of sodium aluminate.

The older water treating processes are disadvantageous because the flocculating agents, such as alum or sodium aluminate, as used in their practice are sensitive to variations in certain factors in the water. Consequently, in prior practice, satisfactory floc formation has been largely dependent upon proper and careful adjustment of the water to produce conditions which are optimum for the particular reagent. Thus, in the case of alum processes if the hydrogen ion concentration of the water is not carefully regulated, it does not floc at all, or the floc formation is insufficient. Sodium aluminate is less sensitive to hydrogen ion concentration than alum, but its successful use in prior processes has required elimination of bicarbonates from the water.

Not only do the foregoing factors militate against the effectiveness of prior processes, but alum is also disadvantageous because elimination of the increased permanent hardness consequent upon its use elevates the cost and further complicates such processes. On the other hand, sodium aluminate tends to exert a softening effect, but where it is used with waters containing less than about fifty parts per million (p.p.m.) of magnesium sulfate, it is necessary to increase the concentration at least to such value by the addition of magnesium sulfate, or its chemical equivalent, before the sodium aluminate will floc.

An object of this invention is to provide water purification processes which are particularly adapted for the clarification of waters containing all kinds of suspended matter, are applicable to all types of water, do not require adjustment or regulation of water factors, are simple, and effect rapid and highly efficient purification at low cost.

A particular object is to provide water treating processes of the type referred to which make use of an aluminate, and especially sodium aluminate, as the flocculating agent, in which a highly coagulating floc is rapidly produced, and which, in addition to clarification of the water, accomplish a material softening effect.

Another object of the invention is to provide a composition for clarifying water, which is adapted to rapidly form an efficient floc in substantially all waters without any preliminary regulation of water conditions, is dry, and is readily produced and handled.

The invention is predicated upon my discovery that the sensitivity of aluminates, and particularly sodium aluminate, to water conditions may be greatly minimized by the addition to the water of a soluble salt of phosphoric acid, and that in the presence of such a material the floc-forming propensity of the aluminate is substantially constant and practically independent of the factors which, as previously mentioned, have heretofore required adjustment of water conditions when using such material. In other words, through the combined use of an aluminate and a material of the stated type, satisfactory flocculation in substantially any water may be effected without preliminary adjustment of the bicarbonate or magnesium sulfate content, or of other conditions.

The invention is particularly adapted for the clarification of waters containing suspended inorganic, organic, bacterial, or other matter, whether for municipal or industrial use, or of polluted origin, such as sewage. In the preferred practice of the invention a soluble phosphate is used, and most suitably trisodium phosphate, although others, such as the mono- or di-sodium salts, or mono-calcium phosphate, or other salts of phosphoric acid which do not impart deleterious properties to the water, may be used with equal effectiveness, all of which will herein be referred to collectively as soluble phosphates.

The materials may be added to the water in the form of solutions, or in dry powdered form, and in varying proportions, and so far as the ultimate effectiveness of the treatment is concerned, the order of addition of these materials appears to be immaterial, with the possible exception noted in the subsequently described Example 3. However, my experiments have disclosed that almost instantaneous flocculation is produced if the soluble phosphate is added to the water previous to or simultaneously with the aluminate.

For the reason just given, and because of the simplified feeding practice consequent upon it, it is preferred to add the sodium aluminate and soluble phosphate together.

I have discovered that eminently satisfactory results may be obtained by using a material made up of $Na_2O$, $Al_2O_3$ and $P_2O_5$ in suitable proportions, and most suitably in proportions which correspond substantially to the empirical formula $Na_2Al_2O_4.Na_3PO_4$. My tests have shown, however, that compositions varying from about $4Na_2Al_2O_4.Na_3PO_4$ to $Na_2Al_2O_4.4Na_3PO_4$ may be used successfully. Where other materials than tri-sodium phosphate are used, the corresponding formulæ would be $Na_2Al_2O_4.nM_x(PO_4)_y$, etc., where M is a metal or other cation. Such material may be made by heating together proper proportions of sodium aluminate and sodium phosphate. When thus prepared the aluminate and phosphate may combine to form chemical or physical complexes. A satisfactory material may equally be made by mixing the two compounds together, in which case it comprises a mere mechanical mixture, or it may be prepared in other ways known in the art. For the purpose of defining these materials, they may be referred to as sodium phospho-aluminates, as appears from the formulæ given, regardless of whether they are combined in the manner indicated by, or whether they merely represent mixtures corresponding to the formulæ.

The benefits to be derived from my invention are indicated by a series of tests in which equal quantities of alum, sodium aluminate, and a mixture of sodium phosphate and sodium aluminate were added to separate samples of raw untreated waters from various sources. The alum produced a flocculent precipitate only in those waters which had hydrogen ion concentrations critical for that compound. The sodium aluminate produced no floc in those waters containing substantial amounts of bicarbonates, and if bicarbonates were reduced to about 25 p.p.m., or were eliminated, a floc was formed only when the magnesium sulphate content of the water was about or above 50 p.p.m. However, in all of the waters the mixture of sodium phosphate and sodium aluminate produced an almost instantaneous and satisfactory flocculent precipitate.

I have further observed in the course of my experiments that sodium phospho-aluminates act definitely to reduce the permanent hardness of the water to a somewhat greater degree than does sodium aluminate. Alum, of course, is in this respect undesirable, since its addition tends to increase rather than decrease the permanent hardness of the water. For instance, the permanent hardness of a raw water possessing 27 p.p.m. of permanent hardness was reduced to 5 p.p.m. after treatment with 2 grains per gallon of a mixture of the composition $Na_2Al_2O_4.Na_3PO_4$, while proper treatment of a similar sample of water with alum increased the permanent hardness to 51 p.p.m.

When highly turbid waters are treated with sodium phospho-aluminates and the results compared with those of samples of the same water treated with alum, or with sodium aluminate as used in prior practice, it is found that the turbidity-removing power of the flocculent precipitate formed by the sodium phospho-aluminates is somewhat superior to that of the precipitate formed by alum or sodium aluminate, even when the treatments are carried out under conditions best suited to such prior treatments. Generally, I have observed that somewhat smaller dosages of a sodium phospho-aluminate having the composition $Na_2Al_2O_4.Na_3PO_4$ will produce a clarifying action equal to normal dosages of the hitherto known reagents of this nature. The flocculent precipitates produced by sodium phospho-aluminates form, as has been mentioned, in waters of substantially any type and in those waters where the success of prior sodium aluminate and alum treatments are dependent on the adjustment of certain water factors. No such adjustments are necessary for the practice of this invention. For example, I have found that the presence of bicarbonates in the water does not substantially interfere with my new treatment, although in some instances the treatment may be benefited if the bicarbonates are destroyed by the use of lime, alkalies, such as sodium hydroxide, or some similar substance.

The following examples illustrate the wide applicability of water treatments in accordance with the invention:

*Example 1.*—To a sample of a highly turbid raw Mississippi River water containing 118 parts per million of temporary or bicarbonate hardness and 27 parts per million of permanent hardness there was added 2 grains per gallon of sodium phospho-aluminate of the approximate composition represented by the formula $Na_2Al_2O_4.Na_3PO_4$. A floc formed almost immediately, and, after standing for 18 hours, the turbidity had been completely coagulated and settled, and the permanent hardness of the water was decreased to 5 p.p.m.

*Example 2.*—To a sample of a raw Mississippi water of composition similar to that of Example 1 there was added 1 p.p.m. of sodium phospho-aluminate of the above-mentioned composition, 9 grains per gallon of lime (72% CaO), and 1 grain per gallon of soda ash. A floc formed almost immediately and after standing for 18 hours the treated water was entirely clear. Analysis of the treated water showed complete elimination of permanent hardness, and reduction of temporary hardness to 47 p.p.m.

From a comparison of the two foregoing examples, it will be seen that the treatment applied in Example 1 is satisfactory for some purposes, since by it the water is efficiently clarified and the permanent hardness materially reduced. However, Example 2 represents a more finished treatment, the main effect of the addition of lime and soda ash being substantial reduction of the temporary hardness and elimination of the residual permanent hardness.

The following examples are illustrative of separate addition of sodium phosphate and sodium aluminate.

*Example 3.*—To sample of a turbid and acid raw Allegheny River water there was added 3.4 grains per gallon of sodium phosphate ($Na_3PO_4.12H_2O$), and, 15 minutes later, 1.7 grains per gallon of sodium aluminate. A floc formed almost immediately, which was allowed to settle for 20 hours. At the end of this time the water was perfectly clear. A treatment using 2 grains per gallon of alum under the same condition produced indifferent results and the resultant water was still turbid. When the order of addition of sodium phosphate and sodium aluminate was reversed, a satisfactory clarification of this water was obtained, but the floc formed was not as voluminous and efficient as where the first-named order of addition was maintained.

*Example 4.*—To a synthetic water containing 150 p. p. m. of bicarbonate alkalinity and 140 p. p. m. of permanent hardness in the form of 60 p. p. m. of calcium sulphate and 80 p. p. m. of magnesium sulphate, there was added 1.7 grains per gallon of sodium aluminate and 3.4 grains per gallon of sodium phosphate ($Na_3PO_4.12H_2O$). A good floc almost immediately obtained regardless of the order of addition of the compounds, and the permanent hardness of the water was decreased to about 105 p. p. m. Sodium aluminate when added alone to this water produced no floc because of the presence of a substantial amount of undestroyed bicarbonates.

When practicing my invention according to the preferred manner, by adding the soluble phosphate and the sodium aluminate simultaneously, or in the form of a complex such as the sodium phospho-aluminates previously described, the compounds are preferably added in a dry state to the water because of the propensity of the compounds to form the desired flocculent precipitate shortly after being placed in the water. But when the compounds are added separately or from separate containers or feeding machines, it is possible to prepare and feed either or both in solution form.

Although in describing my invention, I have referred to specific compositions and to particular waters, it will be understood that the invention is applicable to water obtained from any source of supply, and that the details of the treatment may be varied considerably without materially changing the beneficial results produced by the practice of the invention.

According to the provisions of the patent statutes, I have explained the principle and mode of operation of my invention, and have described examples of what I now consider to represent its best embodiment. However, I desire to have it understood that, within the scope of the appended claims, the invention may be practiced otherwise than as specifically described.

I claim as my invention:

1. The method of treating water, comprising adding thereto a soluble phosphate and a soluble aluminate in proportions adapted to cause flocculation when dissolved in water.

2. The method of treating water, comprising adding thereto a soluble phosphate and sodium aluminate in proportions adapted to cause flocculation when dissolved in water.

3. The method of treating water, comprising adding thereto a sodium phosphate and sodium aluminate in proportions adapted to cause flocculation when dissolved in water.

4. The method of treating water, comprising adding thereto a coagulant-forming material the composition of which corresponds substantially from $4Na_2Al_2O_4.Na_3PO_4$ to $Na_2Al_2O_4.4Na_3PO_4$.

5. The method of treating water, comprising adding thereto a coagulent-forming material whose composition corresponds substantially to $Na_2Al_2O_4.Na_3PO_4$.

6. The method of treating water to soften it and remove turbidity, comprising adding to the water a softening agent, a soluble phosphate, and sodium aluminate in proportions adapted to cause flocculation when dissolved in water.

7. The method of treating water to soften it and remove turbidity, comprising adding to the water soda ash, a soluble phosphate, and sodium aluminate.

8. The method of treating water to soften it and remove turbidity, comprising adding to the water lime, soda ash, sodium phosphate and sodium aluminate.

9. The method of treating water to soften it and remove turbidity, comprising adding to the water a softening agent and a coagulant-forming material having a composition of from $4Na_2Al_2O_4.Na_3PO_4$ to $Na_2Al_2O_4.4Na_3PO_4$.

10. In a method of treating water to remove turbidity, the steps comprising adding a soluble phosphate to the water, and subsequently adding sodium aluminate to cause rapid formation of a coagulating floc.

11. A dry water clarifying and softening composition of matter, comprising an aluminate and a soluble phosphate.

12. A water clarifying and softening composition of matter, comprising a material corresponding in composition between $4Na_2Al_2O_4 \cdot M_x(PO_4)_y$ and $Na_2Al_2O_4 \cdot 4M_x(PO_4)_y$, where M is a metal or other cation.

13. A water clarifying and softening composition of matter, comprising a material corresponding in composition between $4Na_2Al_2O_4 \cdot Na_3PO_4$ and $Na_2Al_2O_4 \cdot 4Na_3PO_4$.

14. A water clarifying and softening composition of matter, comprising a material whose composition is substantially $Na_2Al_2O_4 \cdot Na_3PO_4$.

15. A dry water treating composition adapted to flocculate in water irrespective of the bicarbonate content of the water, composed of a mixture of sodium aluminate and sodium phosphate.

In testimony whereof, I sign my name.

RALPH B. DERR.